(12) United States Patent
Kaye et al.

(10) Patent No.: US 7,102,633 B2
(45) Date of Patent: Sep. 5, 2006

(54) METHOD FOR CONFORMING OBJECTS TO A COMMON DEPTH PERSPECTIVE FOR CONVERTING TWO-DIMENSIONAL IMAGES INTO THREE-DIMENSIONAL IMAGES

(75) Inventors: Michael C. Kaye, Agoura Hills, CA (US); Charles J. L. Best, Los Angeles, CA (US)

(73) Assignee: In-Three, Inc., Westlake Village, CA (US)

( * ) Notice: Subject to any disclaimer, the term of this patent is extended or adjusted under 35 U.S.C. 154(b) by 194 days.

(21) Appl. No.: 10/147,380

(22) Filed: May 15, 2002

(65) Prior Publication Data

US 2005/0099414 A1 May 12, 2005

Related U.S. Application Data

(63) Continuation-in-part of application No. 10/029,625, filed on Dec. 19, 2001, now Pat. No. 6,515,659, which is a continuation-in-part of application No. 09/819,420, filed on Mar. 26, 2001, now Pat. No. 6,686,926, which is a continuation-in-part of application No. 09/085,746, filed on May 27, 1998, now Pat. No. 6,208,348.

(51) Int. Cl.
*G06T 15/00* (2006.01)

(52) U.S. Cl. ....................................................... 345/419
(58) Field of Classification Search ................. 345/418, 345/419, 420, 426, 427, 428
See application file for complete search history.

(56) References Cited

U.S. PATENT DOCUMENTS

| | | | |
|---|---|---|---|
| 3,772,465 A | 11/1973 | Vlahos et al. ............... 382/167 |
| 4,475,104 A | 10/1984 | Shen ........................... 345/422 |
| 4,600,919 A | 7/1986 | Stern ........................... 340/725 |
| 4,606,625 A | 8/1986 | Geshwind ..................... 352/38 |
| 4,608,596 A | 8/1986 | Williams et al. .............. 358/81 |
| 4,645,459 A | 2/1987 | Graf et al. .................... 434/43 |
| 4,647,965 A | 3/1987 | Imsand ........................ 358/88 |
| 4,697,178 A | 9/1987 | Heckel ......................... 345/422 |
| 4,723,159 A | 2/1988 | Imsand ........................ 358/88 |
| 4,809,065 A | 2/1989 | Harris et al. .................. 348/51 |
| 4,888,713 A | 12/1989 | Falk ............................ 364/522 |
| 4,925,294 A | 5/1990 | Geshwind et al. ............ 352/57 |
| 4,933,670 A | 6/1990 | Wislocki ..................... 345/167 |
| 4,965,844 A | 10/1990 | Oka et al. ..................... 382/44 |
| 5,177,474 A | 1/1993 | Kadota ........................ 345/642 |
| 5,181,181 A | 1/1993 | Glynn ......................... 702/141 |
| 5,185,852 A | 2/1993 | Mayer ......................... 358/1.1 |
| 5,237,647 A | 8/1993 | Roberts et al. ............. 345/419 |
| 5,341,462 A | 8/1994 | Obata .......................... 345/422 |
| 5,347,620 A | 9/1994 | Zimmer ....................... 345/592 |
| 5,428,721 A | 6/1995 | Sato et al. |
| 6,031,564 A | * 2/2000 | Ma et al. ....................... 348/43 |
| 6,215,516 B1 | * 4/2001 | Ma et al. ....................... 348/43 |
| 6,515,662 B1 | * 2/2003 | Garland ....................... 345/427 |
| 6,590,573 B1 | 7/2003 | Geshwind ................... 345/419 |
| 6,650,339 B1 | 11/2003 | Silva et al. |
| 6,677,944 B1 | * 1/2004 | Yamamoto ................. 345/422 |
| 6,686,926 B1 | * 2/2004 | Kaye ........................... 345/680 |

OTHER PUBLICATIONS

Hanrahan et al., "Direct WYSIWYG painting and texturing on 3D shapes", Computer Graphics, vol. 24, Issue 4, pp. 215–223. Aug. 1990.

(Continued)

*Primary Examiner*—Phu K. Nguyen
(74) *Attorney, Agent, or Firm*—Henricks, Slavin & Holmes LLP

(57) ABSTRACT

Methods for converting two-dimensional images into three-dimensional images employing various interactive image processing tools that allow a user to apply any number or combination of image pixel repositioning depth contouring effects, algorithms or the like to create three-dimensional images.

14 Claims, 14 Drawing Sheets

OTHER PUBLICATIONS

Grossman, "Look Ma, No Glasses", Games, Apr. 1992, pp. 12–14.

Slinker et al., "The Generation and Animation of Random Dot and Random Line Autostereograms", Journal of Imaging Science and Technology, vol. 36, No. 3, pp. 260–267, May 1992.

A. Michael Noll, *Stereographic Projections by Digital Computer,* Computers and Automation, vol. 14, No. 5 (May 1965), pp. 32–34.

A. Michael Noll. *Computer–Generated Three–Dimensional Movies,* Computers and Automation, vol. 14, No. 11 (Nov. 1965), pp. 20–23.

* cited by examiner

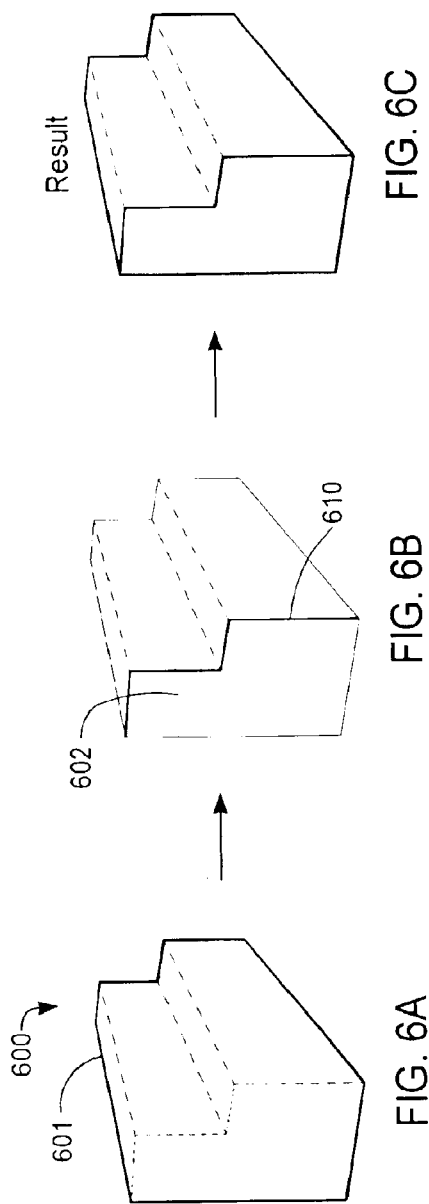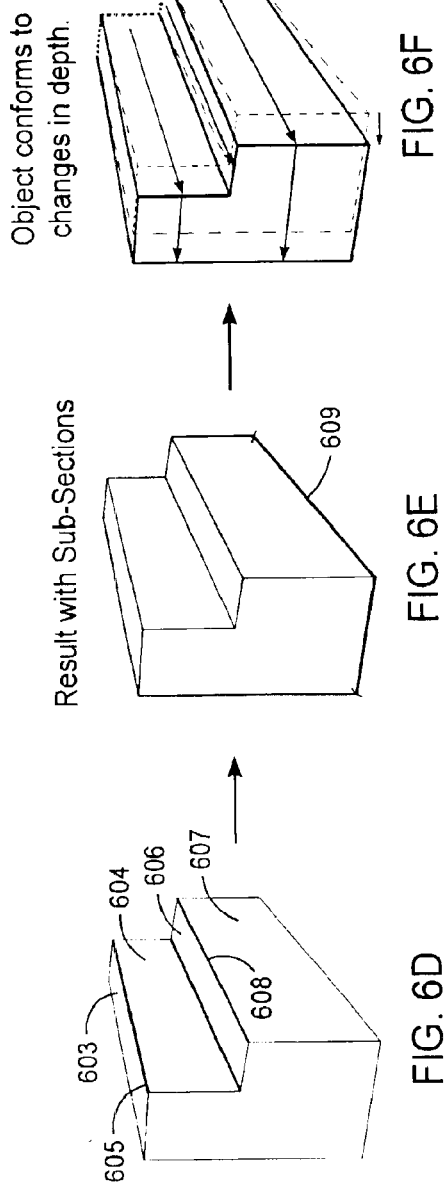

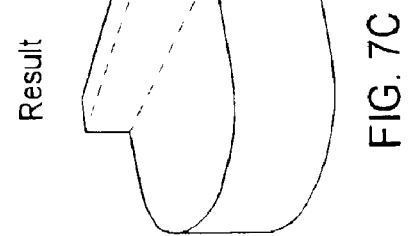
FIG. 7A
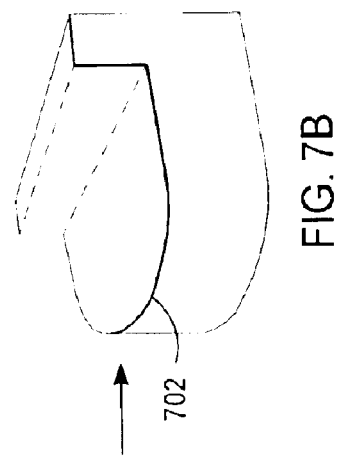
FIG. 7B
FIG. 7C
Result
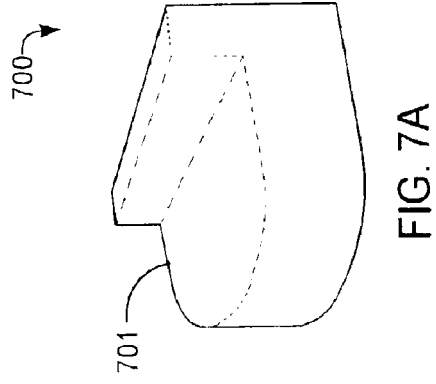
FIG. 7D
FIG. 7E
Result with Sub-Sections
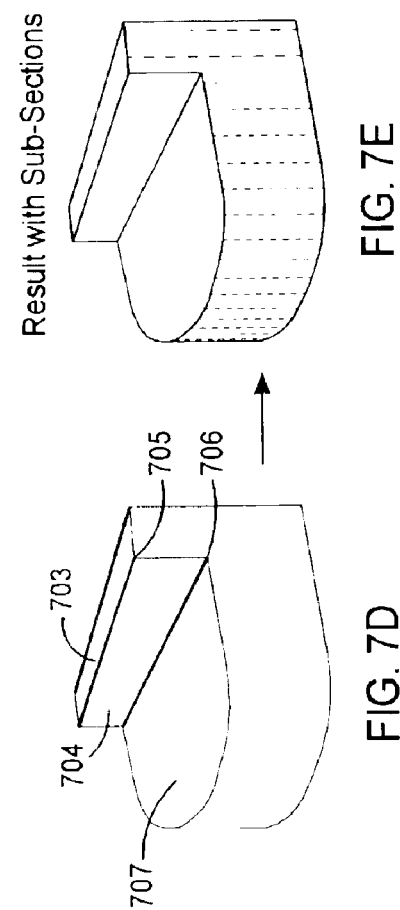
FIG. 7F
Object conforms to changes in depth.

Object conforms to changes in depth.

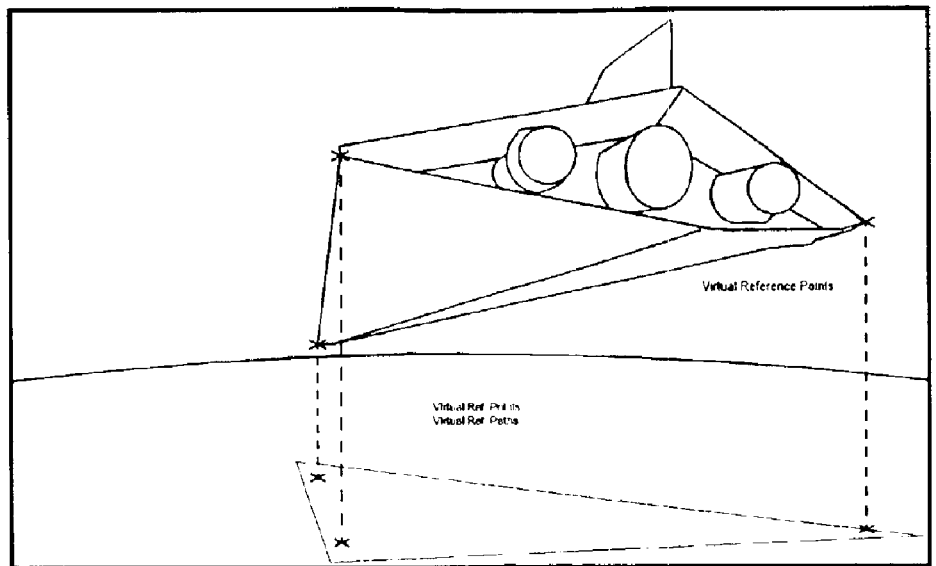
1100 ⬈  FIG. 11A
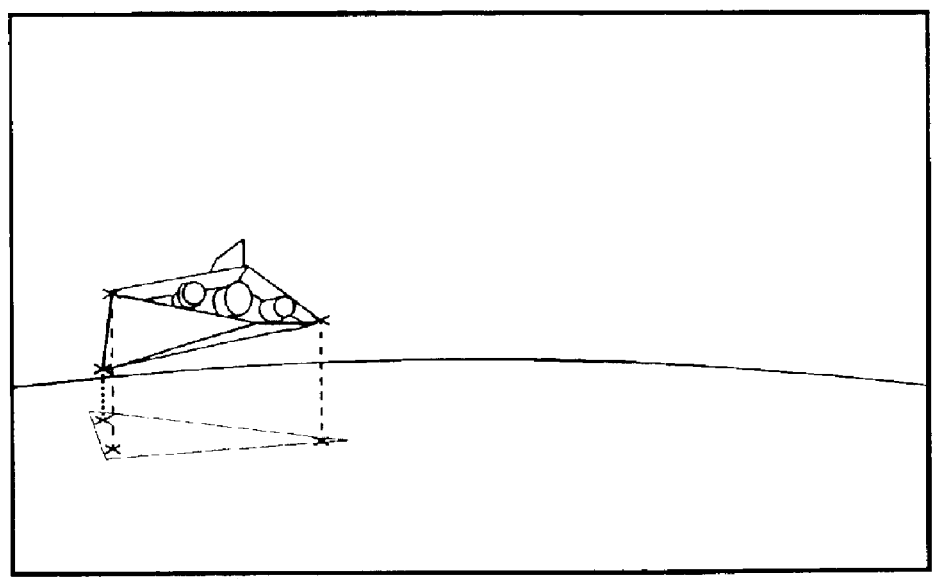
1100' ⬈  FIG. 11B

METHOD FOR CONFORMING OBJECTS TO A COMMON DEPTH PERSPECTIVE FOR CONVERTING TWO-DIMENSIONAL IMAGES INTO THREE-DIMENSIONAL IMAGES

CROSS-REFERENCE TO RELATED APPLICATIONS

This application is a continuation-in-part of U.S. patent application Ser. No. 10/029,625 entitled "Method And System For Creating Realistic Smooth Three-Dimensional Depth Contours From Two-Dimensional Images" filed on Dec. 19, 2001, now U.S. Pat. No. 6,515,659, which is a continuation-in-part of U.S. patent application Ser. No. 09/819,420 entitled "Image Processing System and Method for Converting Two-Dimensional Images Into Three-Dimensional Images" filed on Mar. 26, 2001, now U.S. Pat. No. 6,686,926 which is a continuation-in-part of U.S. patent application Ser. No. 09/085,746 entitled "System and Method for Converting Two-Dimensional Images into Three-Dimensional Images" filed on May 27, 1998, now U.S. Pat. No. 6,208,348, all of which are incorporated herein by reference in their entirety.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention relates to methods for conforming objects to a common depth perspective for converting two-dimensional images into three-dimensional images.

2. Description of the Related Art

In order for a three-dimensional image that is rendered from a two-dimensional image to appear realistic it often needs to include many smooth and complex transitions of depth. Unfortunately, known tools within graphic software packages or software filter plug-ins are not specifically designed to convert two-dimensional images into three-dimensional images and, consequently, do not facilitate an accurate true and believable re-creation of a three-dimensional image.

Moreover, known graphics-related software and methods for manipulating images do not provide tools that are capable of facilitating the individual conversion of a large number of two-dimensional images into three-dimensional images in a way that is practical or in a way that can be accomplished within a practical time realm. In order to be able to process a large number of images (as in the hundreds of thousands of frames in the typical motion picture) in a way that is practical and not time prohibitive, tools not yet known to exist would be required. Thus, it would be desirable to be able to provide methods for conforming objects to a common depth perspective for converting two-dimensional images into three-dimensional images in a manner that addresses the afore-described deficiencies of existing image processing software and methods.

SUMMARY OF THE INVENTION

The methods of the present invention relate to re-creating depth information that was perhaps never actually recorded and, in so doing, creating a set of three-dimensional motion picture images from two-dimensional motion picture images that can then be used for viewing. According to the present invention, objects or subjects are defined and appropriate depth information is restored back into image objects or the image as a whole, producing a three-dimensional result as if the starting image had been originally photographed in three-dimensions to begin with. One or more pixel manipulating algorithms are used to affect image pixels along the horizontal X-axis within an image to effectively cause forward or back depth perspective and shape. In various embodiments, the placement of pixels is performed to a sub-pixel level in order to achieve the finest and most accurate depth detail, resulting in a highly realistic three-dimensional reproduction.

The present invention relates to methods for converting two-dimensional images into three-dimensional images in an expedient way permitting a time allowable system to exist for implementing a conversion of the large number of frames that make up a typical motion picture. In order to create a three-dimensional image out of a two-dimensional image, another perspective of the image that was perhaps not originally recorded is created or reconstructed. In various embodiments, the images are reconstructed by applying one or more, or a multitude, of various linear or non-linear algorithms that cause pixels to be displaced in the image.

In order to recreate realistic appearing three-dimensional images, image objects are defined in some manner and depth information is associated with these objects. According to the present invention, this is accomplished manually or by semi- or fully-automatic methods.

In the process of converting motion pictures into 3D, it is critical to have at one's disposal a set of tools or methods that are capable of conveniently facilitating the conversion of hundreds of thousands of frames in a time allowable realm. Otherwise, the process would be time prohibitive and not of practical utility for purposes of converting motion pictures into 3D.

Embodiments of the present invention pertain to methods that allow objects making up an image to be automatically placed at their respective and appropriate depth locations within the image. Such methods save an enormous amount of time as opposed to having to manually place image objects at their appropriate depth locations.

According to various embodiments of the present invention, the bottommost points of objects are referenced and/or attached to other objects. Although it often makes sense to link objects in this manner, in other embodiments, portions of objects other than the bottommost points are referenced and/or attached to other objects in the image.

The present invention further involves various methods that allow objects making up an image to be easily referenced to one another so that objects will move together, or track one another, thus making it much simpler for objects to conform together to their proper depth perspective. By allowing objects, or portions of objects, to be referenced and track together, three-dimensional conversion processing of motion pictures according to the present invention occurs rapidly and efficiently.

Various embodiments of the present invention pertain to related methods that are used to easily provide three-dimensional shape to image objects, as well as apply an overall perspective reference to images which, in turn, causes the objects in an image to conform together as any one of the objects is moved as a result of the application of depth algorithm(s).

Other embodiments of the present invention relate to methods for permitting camera angle and/or positional changes to be used to automatically calculate depth changes as scenes change their perspective angles or positions. All of the tools described herein, or various subcombinations of these tools, represent various embodiments of processes for effecting three-dimensional motion picture conversions according to the present invention.

The term DIMENSIONALIZE™ process (or DIMENSIONALIZING™ or DIMENSIONALIZATION™ process) makes reference to and identifies any of the methods for converting standard two-dimensional images into three-dimensional images according to the present invention. The process fundamentally involves employing any combination of software, hardware and/or firmware to process two-dimensional images (e.g., scanned images or captured images in a computer system) and to recreate depth information that perhaps was not recorded when the two-dimensional images were originally created, thus facilitating the creation of realistic appearing three-dimensional motion picture images which can be used for viewing directly or projecting.

The DIMENSIONALIZE™ process involves actions taken by a person (referred to as a DIMENSIONALIST™) who performs or directs the tasks of evaluating images and defining objects or subjects (e.g., by drawing around the objects or subjects within the images). Through the process, appropriate depth information is associated with the identified objects thereby providing restored, or recreated three-dimensional images that appear as realistic as if the original two-dimensional image had been captured or created in three-dimensions to begin with.

As part of the DIMENSIONALIZATION™ process, objects are repositioned on the horizontal axis (X-axis) of an image to effectively cause forward or back depth placement. In order to achieve the most accurate and smooth realistic three-dimensional reproduction, the horizontal placement (repositioning) of pixels is performed to a sub-pixel level. Although there is a correlation of depth and dimension to pixel placement, the DIMENSIONALIZATION™ process—as implemented with present day technology—still needs to be monitored by the DIMENSIONALIST™ to ensure optimal accuracy as there are too many variables affecting depth placement (due to the multitude of possible camera angles within a given scene and image).

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIG. 6A illustrates an object defined as a whole object;

FIG. 6B illustrates the object of FIG. 6A being sub-divided with a dividing path line;

FIG. 6C illustrates the result of the object of FIG. 6B being sub-divided;

FIG. 6D illustrates the object of FIG. 6A being further divided with three more dividing path line sections;

FIG. 6E illustrates the object of FIG. 6A with its bottom perimeter being defined as a reference path line;

FIG. 6F illustrates the result of the object of FIG. 6A when perspective is applied;

FIG. 7A illustrates a curved object defined as a whole object;

FIG. 7B illustrates the object of FIG. 7A being sub-divided with a dividing path line;

FIG. 7C illustrates the result of the object in FIG. 7B being sub-divided;

FIG. 7D illustrates the object of FIG. 7A being further divided with three more dividing path line sections;

FIG. 7E illustrates the result of FIG. 7A having been divided into sub-objects;

FIG. 7F illustrates the result of FIG. 7A when perspective is applied to the object;

FIG. 11A illustrates an example of an image with an object in free space, not attached or adjacent to any objects, with a projected surface.

FIG. 11B illustrates the example of FIG. 11A except several frames later showing how the object maintains its tracking to its projected surface;

DETAILED DESCRIPTION

Figure 1:
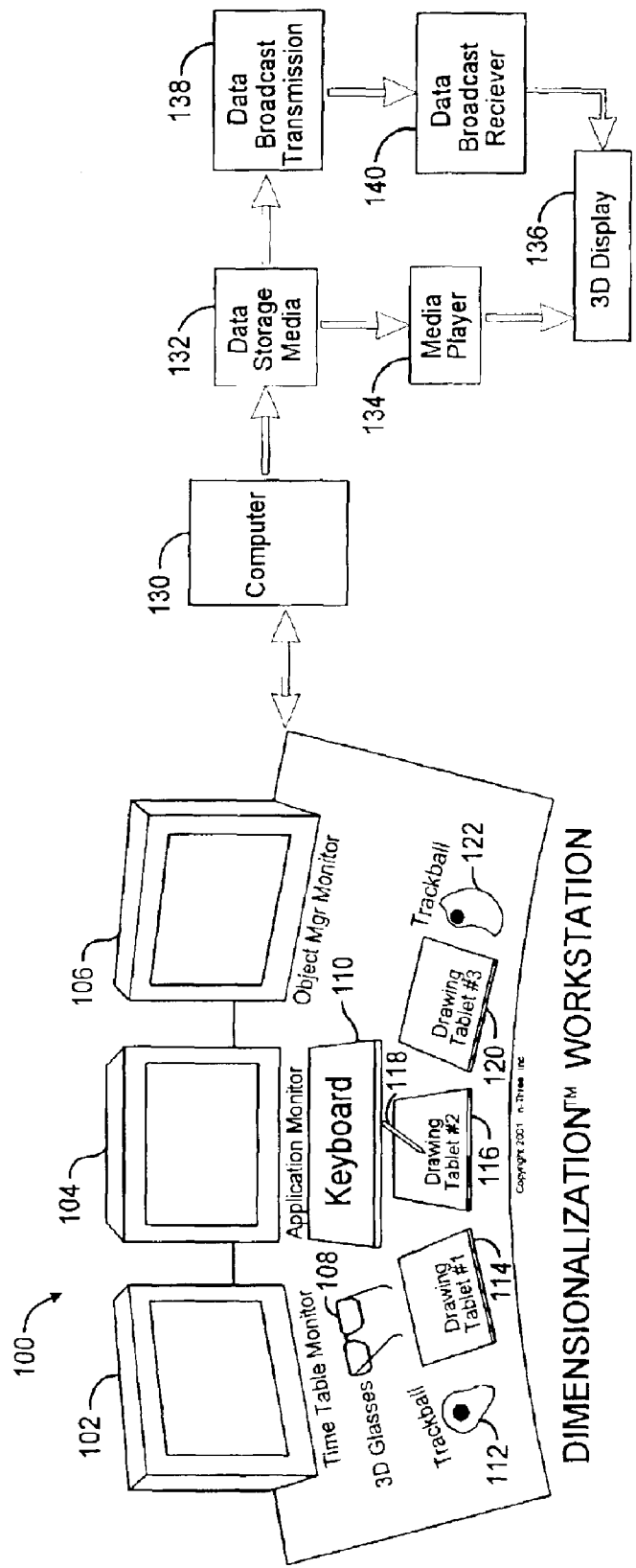
FIG. 1 illustrates an exemplary workstation for implementing the image processing techniques of the present invention.

Referring to FIG. 1, a workstation 100 according to the present invention includes one or more video monitors which provide a user of the DIMENSIONALIZATION™ process with an interactive interface through which a plurality of original images can be duplicated and rendered into three-dimensional images. More specifically, the interactive interface embodies a plurality of tools particularly adapted to facilitate rendering of three-dimensional complementary images such that each resulting complementary image and its corresponding original image provide a stereo pair of images for a three-dimensional image. It should be noted however that the scope of the present invention additionally includes creating or rendering multiple frames, rather than a single frame.

The exemplary workstation 100 shown in FIG. 1 includes a time table monitor 102, an application monitor 104, an object manager monitor 106, three-dimensional glasses 108 and one or more user input mechanisms such as a keyboard 110, trackballs (or mouse) 112, 122, drawing tablets 114, 116, 120 and a drawing pen 118. The workstation also includes a processor/controller 130 which is programmed to provide signals to the monitors 102, 104, 106, control the visual displays at these monitors, and receive and process user inputs provided to the system via the user input mechanisms 110, 112, 114, 116, 118, 120, 122, i.e., control the interactive interface. The processor/controller 130 is programmed to provide, in conjunction with the three-dimensional glasses 108 (which synchronize to a signal from the processor/controller), a three-dimensional image at the application monitor 104 which is updated thus allowing the user to observe changes in the depth or placement of various objects within the three-dimensional image. As described below in greater detail, the object manager monitor 106 is employed to display the original images over a number of frames, their objects, and sub-objects. The object manager provides a display allowing the user to maintain organization over a multitude of frames representing time. The processor/controller 130 is programmed to allow the user to select objects within images and to horizontally reposition portions of these objects within an image automatically via a plurality of interactive tools which include object rendering functions.

In addition to controlling the processes within the DIMENSIONALIZATION™ workstation, the processor/controller 130 can be used to send the processed data to storage or through various outlets for use. The processed DIMENSIONALIZED™ data can be stored on data storage media 132, which may include solid state memory, magnetic tape, magnetic disc, or optical disc such as compact discs or digital versatile disc (DVD) type removable storage. By storing the DIMENSIONALIZED™ product onto removable media, the data can be reproduced and viewed in a wide variety of ways. For example, DVDs can be used in a media player 134 to play back the DIMENSIONALIZED™ data for three-dimensional (3D) reproduction on a 3D display 136 in a home or professional environment, such as a theatre. The DIMENSIONALIZED™ data can also be broadcast (data broadcast transmission 138) over cable, via the Internet, for example, or be broadcast by electromagnetic transmission such as Satellite or television type transmission. Once the DIMENSIONALIZED™ data is received (data broadcast receiver 140) it can then be used in a wide variety of display applications such as, home entertainment or theatre projection, just to name a few.

It should be understood that the functions implemented by the processor/controller 130 can be performed by one or more processor/controller. Moreover, these functions can be implemented employing a combination of software, hardware and/or firmware taking into consideration the particular requirements, desired performance levels, etc. for a given system or application.

In various embodiments, some objects are defined as "VIRTUAL OBJECTS™". "Virtual Objects" are objects that are defined or drawn ignoring other objects that may exist in front of the object being defined. In other words, if an object is defined, such as a floor, for example, the floor is defined with the focus being only the floor, as if no other objects were in the way. Objects that may exist on the floor are ignored and consequently not defined or drawn. For the purposes of this illustration, sub-objects are also not shown. Sub-objects are portions of objects that are defined for the purpose of applying separate depth algorithms to.

Various embodiments of the present invention provide the ability for objects to be automatically referenced to other objects which significantly increases the speed of the 2D to 3D conversion process. By way of example, as objects are defined, their positions relative to other objects in the image are automatically determined and the objects are automatically placed at these positions.

A "Reference to Bottom" feature (or tool), according to various embodiments of the present invention, allows objects to be assigned a "bottom reference" which is employed to automatically place the objects at the correct depth as they are defined. This feature is particularly useful because, due to gravity, the bottommost portion of objects often are in contact with objects beneath them. An advantageous result of this feature is that the depth values at the bottommost points of contact do not need to be manually placed by the user, rather these values are automatically determined. By way of example, a depth value for a bottommost point of contact is assigned (matched) to a depth value associated with the referenced object beneath the bottommost point of contact. Moreover, eliminating the need to place objects provides significant time savings which is crucial when faced with the task of converting the hundreds of thousands of frames of a typical motion picture. It should be appreciated, however, that other types of object reference tools can be employed (and at anytime during the image conversion process) to assign to an object a depth value that has already been associated with another object, nearest appropriate background, etc.

Figure 2A:
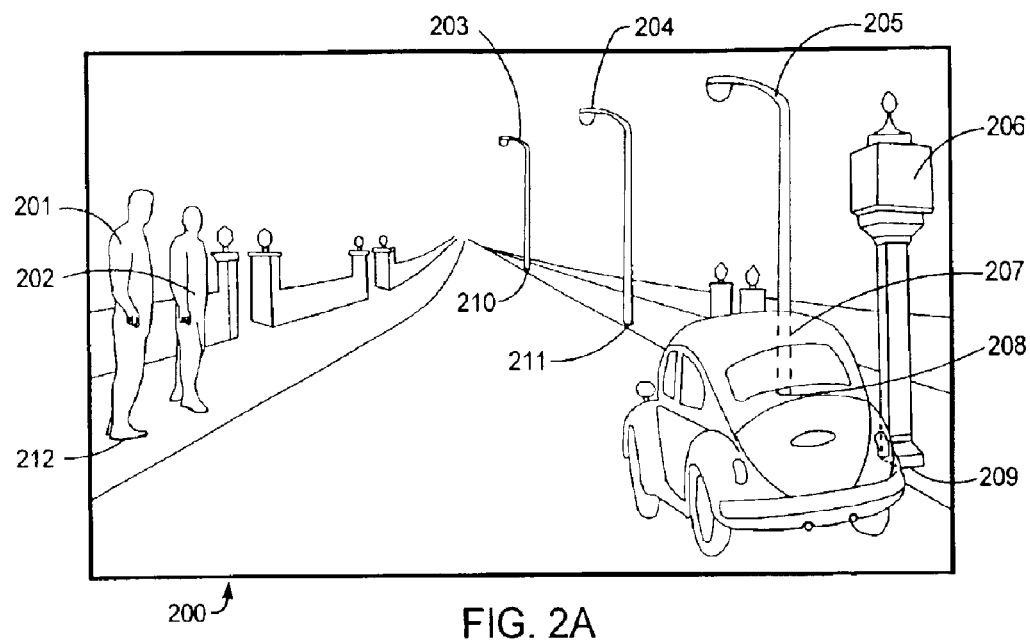
FIG. 2A illustrates an example of an image containing multiple defined objects.
Figure 2B:
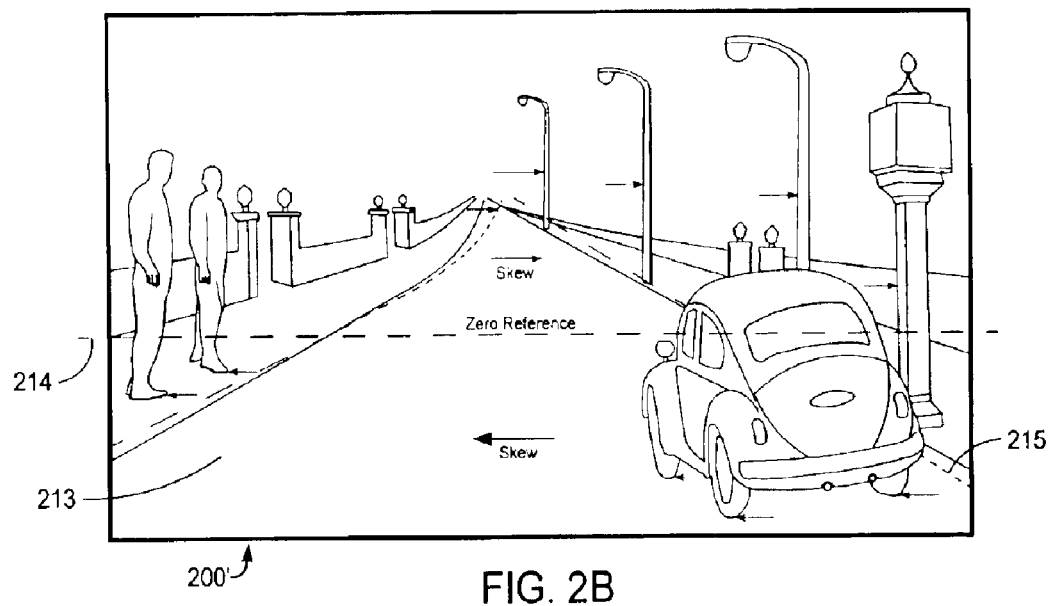
FIG. 2B illustrates an example of the image of FIG. 2A, after the road object has been skewed.

FIGS. 2A and 2B show images 200 and 200', respectively, and illustrate how the "Reference To Bottom" feature can be used to automatically position multiple objects in depth to their corresponding background. For example, by employing the "Reference To Bottom" feature, the two people, or rather their objects 201 and 202, can be (instantaneously) placed at the depths of the respective points at which they stand with no additional user input. In this case, the objects 201 and 202 will be assigned the depth values of the background immediately behind their bottommost points, i.e., the depth values associated with the respective points on the sidewalk beneath their feet. For example, the depth value associated with a point on the sidewalk behind a bottommost point 212 is assigned to the object 201. Lampposts 203 and 204 and the street clock 206 can be attached in the same way at their bottommost points 210, 211 and 209, respectively. Lamppost 205 can be attached in the same manner except, in this case, the lamppost has been defined as a virtual object since part of that object is covered up. As a virtual object, the lamppost 205 is defined in its virtual entirety, which from the illustrated perspective includes dashed boundary line 207, and is attached in the same way at its bottommost point 208. Both whole and virtual objects can be attached with automatic depth placement with the same efficiency.

Referring to FIG. 2B, a zero reference plane 214 (shown as a dashed line), also referred to as a depth focal point, is the point in space where there is no placement of depth, which leaves that depth location at the plane of the screen or monitor. A "Zero Reference" feature of the present invention provides the user with the ability to easily assign any point or path in the image to a "Zero Reference". In various embodiments, the "Zero Reference" plane can be altered at any time during the image conversion process.

Once objects have been assigned a reference, they can automatically track the depth of whatever they have been referenced or attached to. By way of example, a skew function may be applied to the road object 213 to give the appearance of perspective with the foreground transitioning into the background. In the foreground (in front of the "Zero Reference" plane), pixels of the road object 213 are shifted to the left as is denoted by dashed road boundary line 215. In the background (behind the "Zero Reference" plane), pixels of the road object 213 are shifted in the opposite direction as they will appear to be further back in space than the plane of the screen. Since the objects 201, 202, 203, 204, 205 and 206 have already been referenced to various points along the road object 213, they will automatically shift their depth positions to track whatever depth values are applied to the road object 213. As a result, a user of the conversion process is required to do far less work and the system functions in a much more expedient fashion.

Thus, according to various embodiments of the present invention, a user is provided with the ability to reference object points, entire path lines or portions of path lines to hidden objects. According to an embodiment of the present invention, a method for converting two-dimensional images into three-dimensional images includes employing an interactive user interface to reference a partially or completely hidden defined object in an image to a reference defined object in the image such that, when pixels of the reference defined object are repositioned within the image, the partially or completely hidden defined object and the reference defined object remain connected together. By way of example, the partially or completely hidden defined object and the reference defined object can be connected together at one or more object points, or at one or more partial or complete path lines.

Figure 3A:
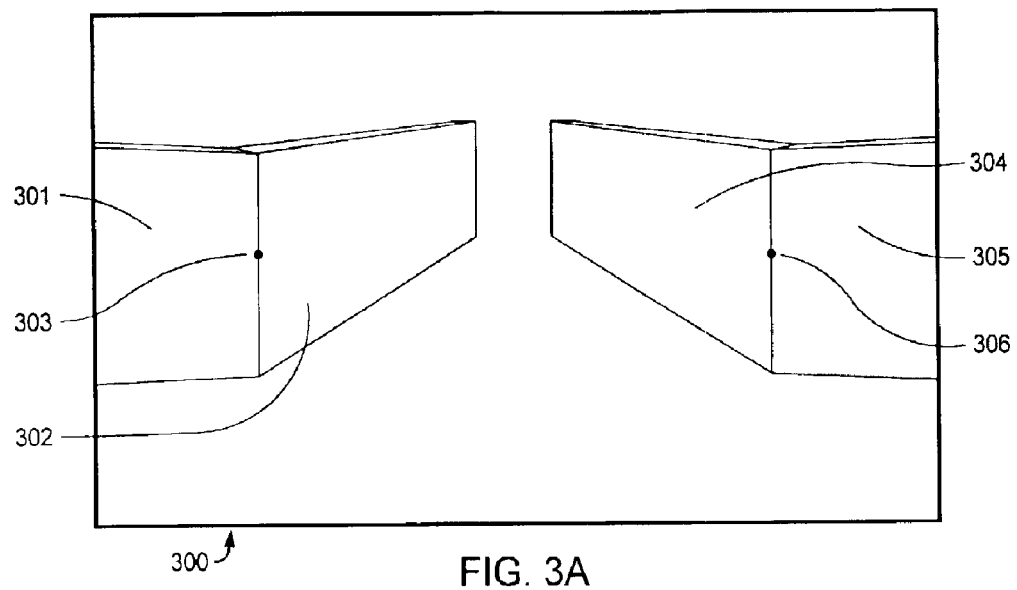
FIG. 3A illustrates an example of an image of connecting walls to demonstrate objects being assigned reference points.
Figure 3B:
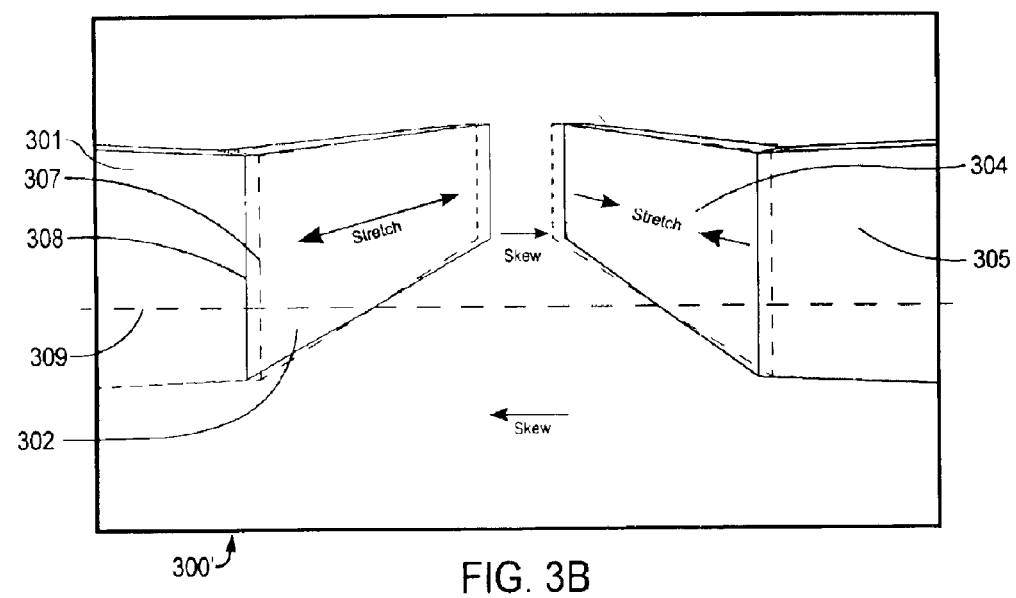
FIG. 3B illustrates an example of the image of FIG. 3A wherein the walls have been shifted in position and remain connected together by their reference points.

Another feature, according to various embodiments of the present invention, is the "Reference To" command. The "Reference To" feature allows a user to mark any point within an object and reference that point of the object to the corresponding screen coordinate point of other objects. For example, FIG. 3A depicts an image 300 with walls 301, 302, 304 and 305. Walls 301 and 302 connect together at referenced point 303. Walls 304 and 305 connect together at referenced point 306. Walls 301 and 305 are in the foreground and walls 302 and 304 run into the background. Given this situation, the two foreground walls 301 and 305 will be positioned. Walls 302 and 304 will have a stretch algorithm applied in order to make them appear as running from foreground into the background. Because both walls 301 and 305 are being positioned towards the foreground, with reference to reference plane 309 (shown in dashed lines), they will shift to the left. Referring to FIG. 3B, a right side 308 of the wall 301 has been shifted to the left of its prior location which is indicated by dashed line 307. As illustrated, wall 302 will therefore stretch becoming longer and wall 304 will compress (or reverse stretch) becoming shorter. Notwithstanding the foregoing terminology, each of these walls is essentially having a "stretch" function applied to it, but to achieve opposite results.

It would be extremely time consuming to have to manually place each and every object to their respective depth locations. With reference to FIGS. 3A and 3B and by way of example, the present invention addresses this concern by allowing the user to simply mark the reference point 303 and attach the wall 302 to the wall 301 employing a "Reference To" command. From that time on (until unreferenced, or unattached, by the user), the wall object 302 follows the reference point 303 no matter where the wall object 301 is shifted to. In this example, employing "Reference To" commands to establish the reference points 303 and 306 keeps the walls 301 and 302 connected to each other and the walls 304 and 305 connected to each other as the walls 301 and 305 are shifted to the left (toward the foreground). It should be noted that in this example single points are shown as references. A single reference allows an object to pivot from that reference point while it stays connected by its reference.

Figure 4A:
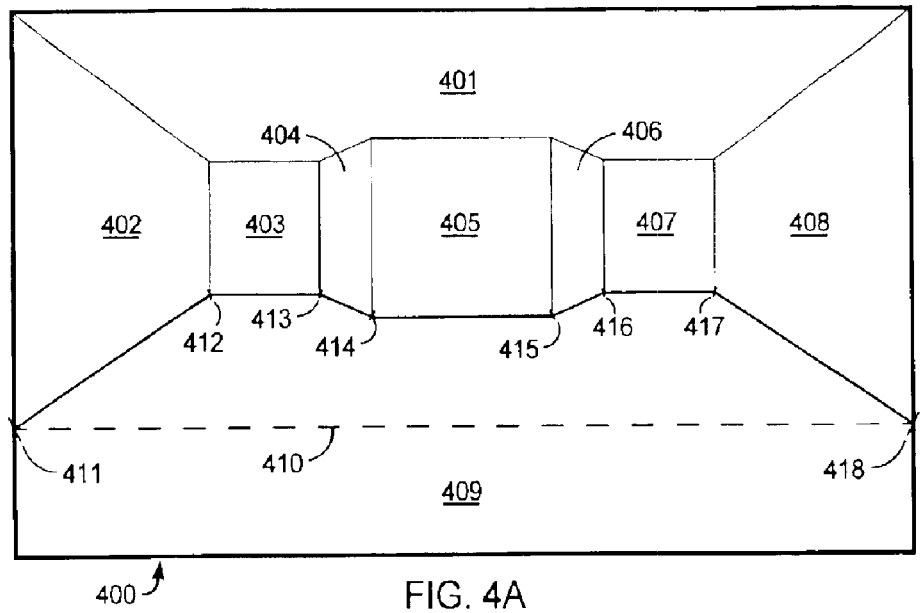
FIG. 4A illustrates an example of an image of a room with a portion of a back wall that protrudes outward to illustrate depth conforming of objects that are referenced together.
Figure 4B:
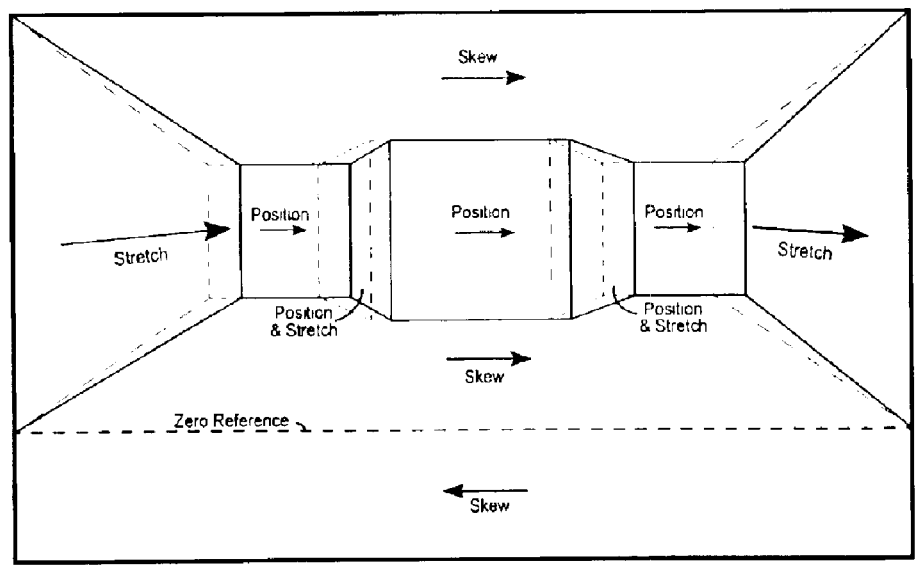
FIG. 4B illustrates an example of the image of FIG. 4A wherein the connecting walls have been shifted and stretched into correct position by virtue of a skew applied to the floor object.

References for attaching objects together may also be in the form of multiple points. According to various embodiments of the present invention, applying multiple reference points to an object causes the shape of the object to conform to the background objects that those points are referenced to, adding perspective to the shape of the object. FIG. 4A shows an example image 400 of a room with a back section that protrudes outward. For the purposes of this example, the ceiling 401, floor 409, and each of the walls 402, 403, 404, 405, 406, 407 and 408 is a defined object. The left wall 402 is attached to the floor 409 by referencing to point 411 and 412. As a result, the left wall 402 now automatically conforms to the perspective provided by movement of the points 411 and 412, for example, when a skew function is applied to the floor 409 as shown in FIG. 4B. With this feature it is not necessary to separately add and adjust a stretch algorithm to the wall 402. The two objects will now conform to each other. In the same manner, the opposite wall 408 will compress (or reverse stretch) as the applied reference points 417 and 418 get closer together also by virtue of the skew applied to the floor object 409. Although the above examples pertain to skew and stretch algorithms conforming together, it should be understood that the referencing of objects together according to the present invention results in the conforming of the shapes of these objects together, independent of the number, types and/or combinations of algorithms that have been applied to the objects.

References for attaching objects together may also be in the form of one or more paths. By way of example, various embodiments of the present invention allow the user to reference objects together by connecting path lines of objects together. Entire path lines or portions of path lines of objects can be referenced together. Another time saving benefit of various embodiments of the present invention is the ability for the user to store connected and common path line objects in the process of object definition. This saves the user valuable time by eliminating the need to redraw sections of objects that have already been drawn.

Figure 5A:
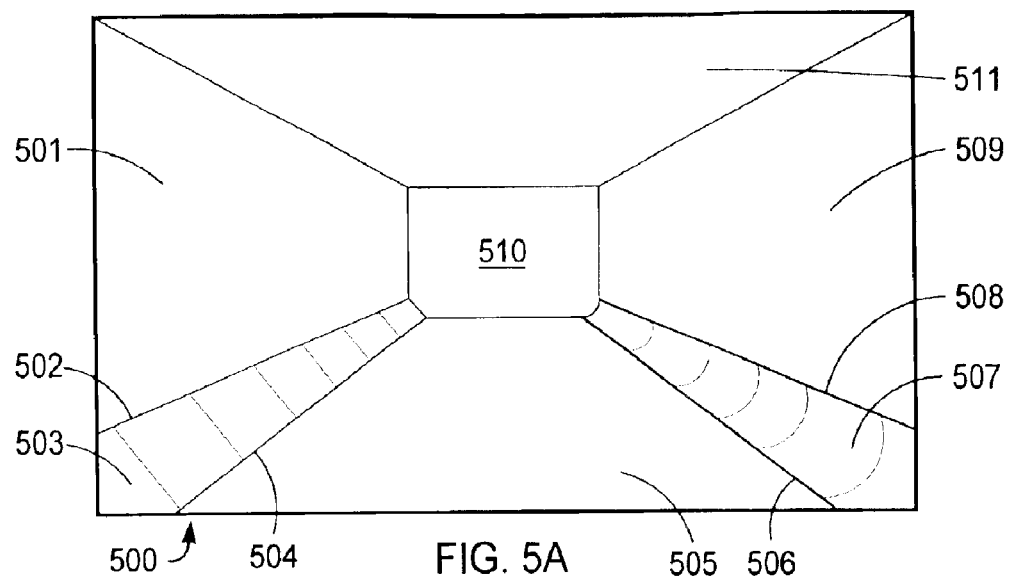
FIG. 5A illustrates an example of a image of a room with other than straight bottom corners.
Figure 5B:
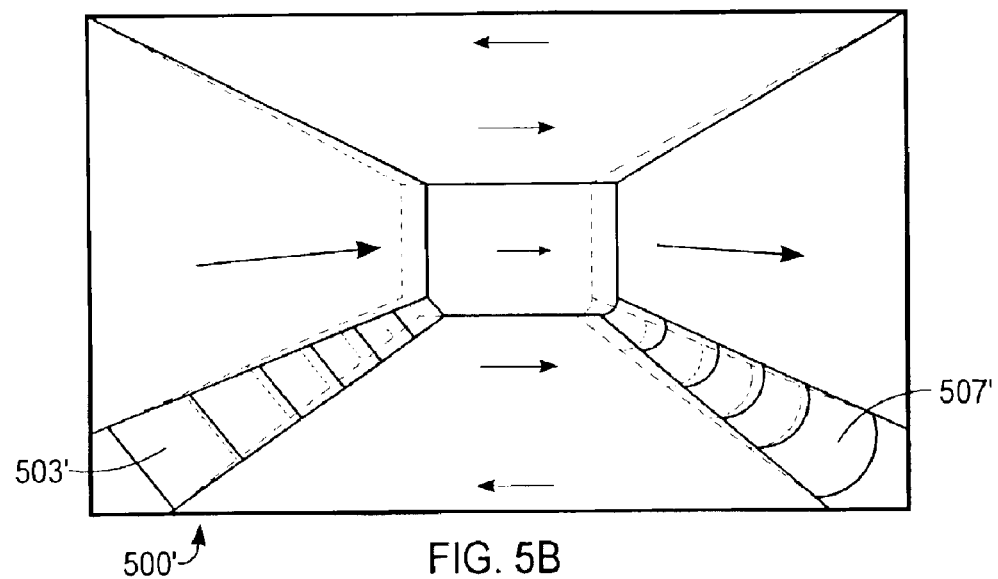
FIG. 5B illustrates an example of the image of FIG. 5A wherein the room perspective has been changed.

Skew and stretch (or other) algorithms may also be applied individually, or automatically by having a designated perspective reference in the image calculate the appropriate algorithms. FIG. 5A also illustrates connected objects conforming together and, more specifically, shows an example of an image 500 of a room protruding away from foreground. In this example, the left wall 501 shares a common path line 502 with object 503. Section 503 is a straight (planar) section of wall connecting between the left wall 501 and floor 505 at a 45 degree angle. Object 503 also shares a common path line 504 with the floor 505. On the right side of the image 500 there is a similar section between the right wall 509 and the floor 505, except this section 507 is curved by a convex bulge contour being applied from one end of this object to the other. This convex shaped object shares common path lines 506 and 508 with the floor 505 and right wall 509, respectively. It should be noted that the left wall 501, the right wall 509 and floor 505 are also connected and referenced to the back wall 510 and the ceiling 511. According to the present invention, since all these objects are referenced together by their connecting path lines, they will all conform to a common perspective as any one of these objects is moved. FIG. 5B illustrates an example of how each of the connected objects will behave when depth is assigned to any of the connected objects.

According to an embodiment of the present invention, a method for converting two-dimensional images into three-dimensional images includes: applying one or more path lines to an image; and associating the path line(s) with a plurality of defined objects in the image such that, when pixels of one of the defined objects are repositioned within the image, the plurality of defined objects remain connected together at the path line(s). As shown in FIGS. 5A and 5B, the path lines can, but do not necessarily, include a plurality of contiguous path lines.

Various embodiments of the present invention also facilitate connecting path lines for use in assigning depth perspective, which is particularly useful for more complex objects. The following discussion makes reference to FIGS. 6A–6F, which depict an example of an object conforming its depth perspective with flat sides. FIG. 6A illustrates an object 600 that has been defined in its entirety with an object path line 601. FIG. 6B illustrates how the user can define a front sub-section 602 with a dividing path line 610, enclosing the closest side (of the object 600), to be used as a closed contour. By way of example, and as described in U.S. patent application Ser. No. 10/029,625 entitled "Method And System For Creating Realistic Smooth Three-Dimensional Depth Contours From Two-Dimensional Images," the user can then easily add (apply) a linear bulge causing the object 600 to conform its shape accordingly from its front to back angles. With objects that are fairly simplistic in their shape, as in FIG. 6A, this is a very expedient method. If the object is not as simple and, for example, has many in-between curves from front to back, the user may choose to use an alternate method to quickly apply shape to the object. FIG. 6C shows the result which is an object divided as two sub-sections, so in effect the bulge algorithm can be modified to accommodate the two or more sections. As depicted in FIG. 6D, the object can be further divided into an upper top sub-section 603 and an upper side sub-section 604 by a defining path line 605. Similarly, the object can be still further divided into a lower top sub-section 606 and a lower side sub-section 607 by a dividing path line 608. FIG. 6E shows the result which is an object that has been divided into all of the sub-sections necessary for conforming its shape as desired. A path line 609 is referenced to the bottom of the object. As shown in FIG. 6F, when the bottom moves, all sides of the object previously defined as sub-objects will automatically conform accordingly. Thus, according to various embodiments of the present invention, an entire object can be made to automatically conform its sub-sections accordingly in response to adjusting any one of its sub-sections.

In the foregoing example, the object had straight lines front to back. However, it should be understood that the principles of the present invention are equally applicable to and accommodate any shape with in-between curves if, for example, the object has curves from front to back rather than being straight.

The following discussion makes reference to FIGS. 7A–7F, which depict an example of an object conforming its depth perspective with curved and flat sides. FIG. 7A illustrates a curved object 700 which is represented as a whole by an object path line 701. FIG. 7B illustrates how the user can draw a dividing path line 702 to separate the side surface from the rest of the object. FIG. 7C shows the result which is an object divided as two sub-sections. Similar to the example discussed above with reference to FIGS. 6A–6F, the resulting front side section in FIG. 7C can also be used as a closed contour with a simple linear bulge algorithm applied. The difference with this curved object 700 is that the straight front section can be divided from the curved section, as depicted by the dashed line 710 in FIG. 7F, so that, although connected together at that path line, a separate curved algorithm can be applied to cause the curved section to bend inward, away from the viewer, while the straight portion maintains its shape. Referring to FIG. 7D, and again similar to the example discussed above with reference to FIGS. 6A–6F, the object 700 can be divided into an upper top sub-section 703 and a side sub-section 704 by a dividing path line 705. Another dividing path line 706 can then be used to further divide the object creating a lower top sub-section 707 adjacent the side sub-section 704. FIG. 7E shows the result which is an object that has been divided into all of the sub-sections necessary for conforming its shape as desired. Since the shape of this object is curved in the front, the surface 708, as seen in FIG. 7F, can conform its round shape by referencing a section of path line 709 to the object below the bottom of the object. As depicted in FIG. 7F, the object can then conform each of its straight and curved sides together, with stretch and/or skew algorithms, and automatically, since all of the sides are connected and referenced together.

According to an embodiment of the present invention, a method for converting two-dimensional images into three-dimensional images includes: employing an interactive user interface to apply a plurality of path lines to a defined object within an image such that the path lines define regions within the defined object, and to selectively apply object shaping algorithms to the defined regions with reference to the path lines.

Objects can be conformed to an appropriate depth perspective in a variety of different ways. According to one embodiment of the present invention, an object is conformed to an appropriate depth perspective by applying a virtual object shape (such as a box) to the object. Generally, the object is referenced to the virtual object shape and then the virtual object shape is manipulated to conform the object to an appropriate depth perspective. This feature is particularly useful for conforming freestanding objects where there is no other object to reference to.

Figure 8A:
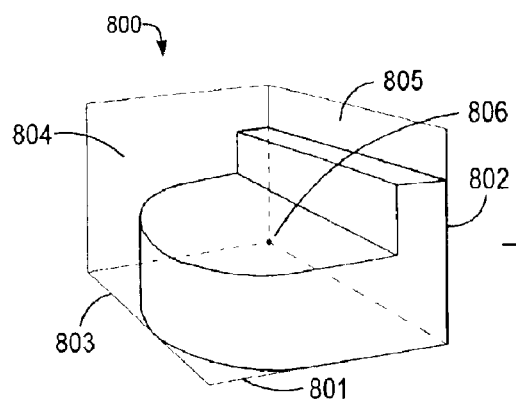
FIG. 8A illustrates an object connected to a virtual box.
Figure 8B:
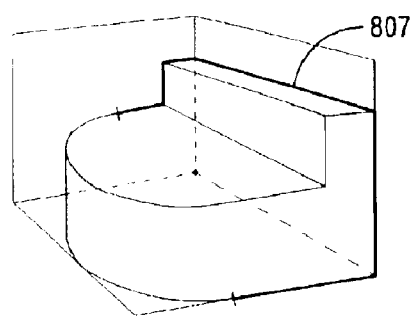
FIG. 8B illustrates the object of FIG. 8A with a connecting path line defined and used as a reference.
Figure 8C:
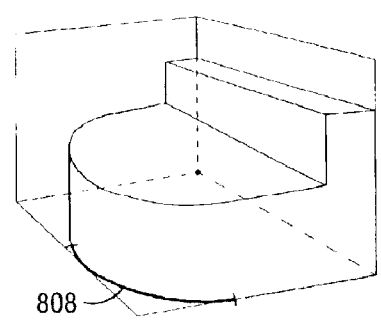
FIG. 8C illustrates the object of FIG. 8A with a second connecting path line referenced to the bottom of the virtual box.
Figure 8D:
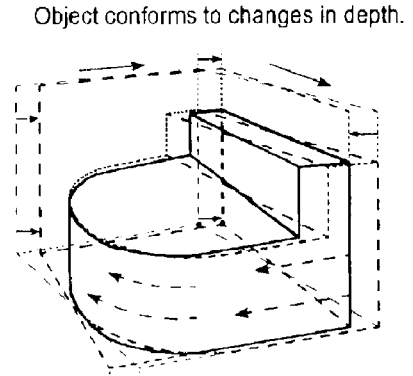
FIG. 8D illustrates the object of FIG. 8A when perspective is applied to the virtual box.

FIG. 8A shows a virtual object shape in the form of a virtual box. The illustrated virtual box 800 includes sides 801, 802 and 803, which can be placed at the edges of the object, and virtual box walls 804 and 805 which can be adjusted, for example, by positioning the intersecting reference point 806. Referring to FIG. 8B, a section of object path line 807 can also be referenced to the virtual box. Referring to FIG. 8C, a front curved section of the object path line 808 can also be referenced to the bottom of the virtual box. As shown in FIG. 8D, the virtual box can then be used to conform the entire object, including complex curved sections, to the depth placement applied to the virtual box. It should be noted that either the virtual box or any point of the object may be used to alter the depth of the object. It should also be reiterated that is only one of the methods according to the present invention for applying depth to an object.

According to an embodiment of the present invention, a method for converting two-dimensional images into three-dimensional images includes: employing an interactive user interface to define a virtual object shape in an image and to associate surfaces of the virtual object shape with portions of one or more defined objects in the image such that pixels in the image associated with the one or more defined objects are automatically repositioned in response to changes made to the virtual object shape. Although the virtual object shape discussed with reference to FIGS. 8A–8D includes a plurality of planar surfaces, it should be understood that virtual object shapes according to the present invention can be any shape, can include any number of distinct surfaces, and can include curved surfaces as well as planar surfaces.

Figure 9A:
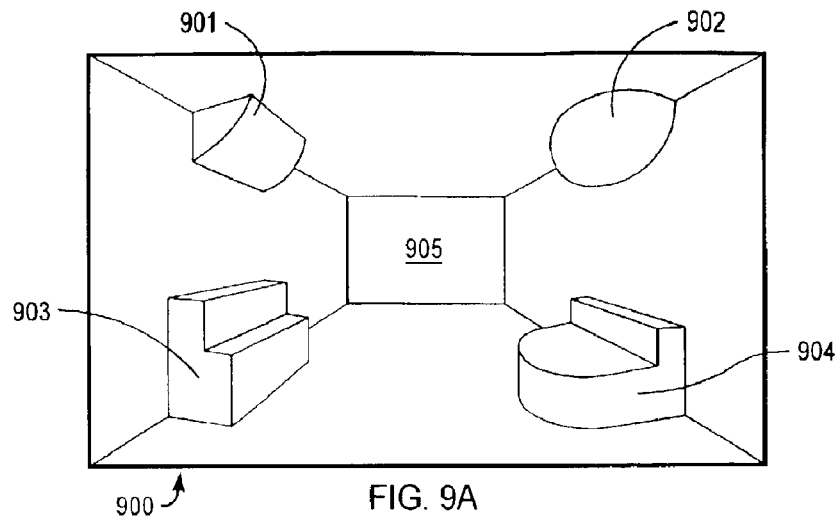
FIG. 9A illustrates an image of a room with four objects.
Figure 9B:
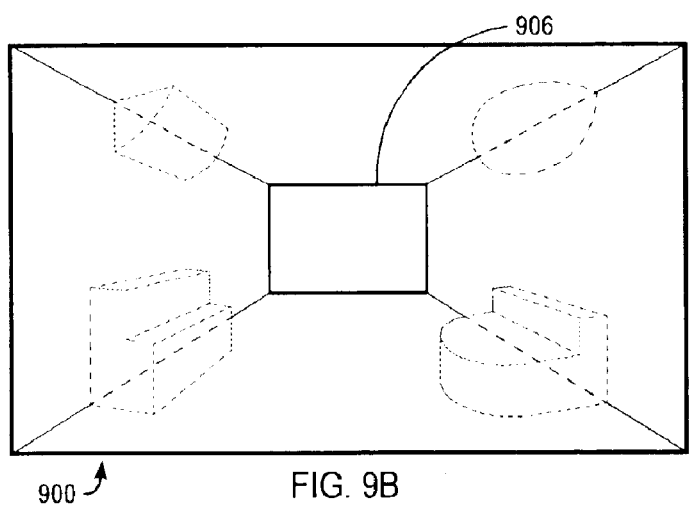
FIG. 9B illustrates the image of FIG. 9A with the back wall defined as a closed contour for applying depth to the entire room.
Figure 9C:
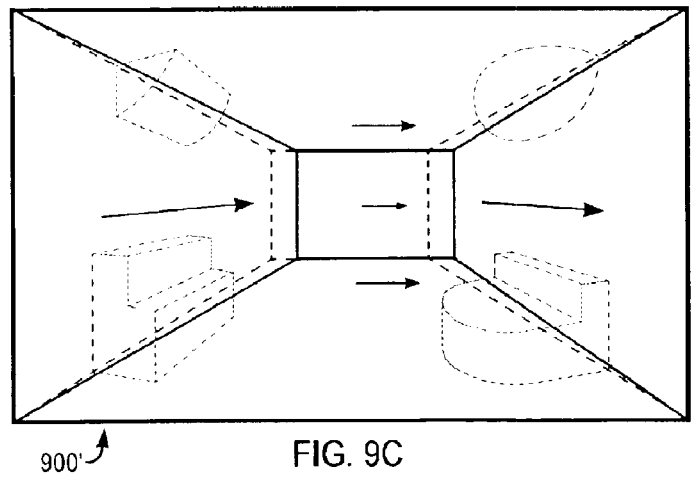
FIG. 9C illustrates the result of applying perspective to the room of FIG. 9A.

Referring to FIGS. 9A–9D, a more complex example of objects conforming together is now described. FIG. 9A shows an image 900 of a room protruding away from the foreground with four arbitrary corner objects 901, 902, 903 and 904. The room itself may be defined as a virtual object. Moreover, various embodiments of the present invention provide the user with the option of defining the walls as separate virtual objects with common connecting path lines, as previously described with reference to FIGS. 5A and 5B, or the entire room may be defined as a single object, and the entire room pushed back in its required depth by defining the back wall 905 as a closed contour with a linear bulge applied. In this example, and referring to FIG. 9B, a closed contour 906 is used to apply a linear bulge in the reverse direction to push the room back giving it depth. As shown in FIG. 9C, in the resulting image 900', the entire room conforms to the appropriate depth applied.

Figure 9D:
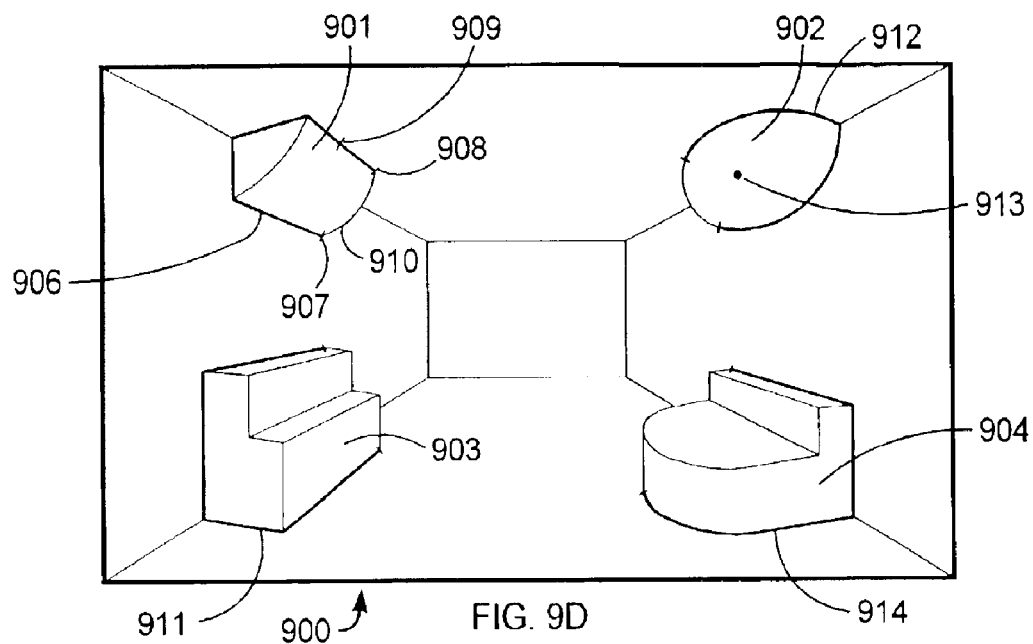
FIG. 9D illustrates the objects of FIG. 9A with the objects having path lines defined to be used as attached references to the surroundings.
Figure 9E:
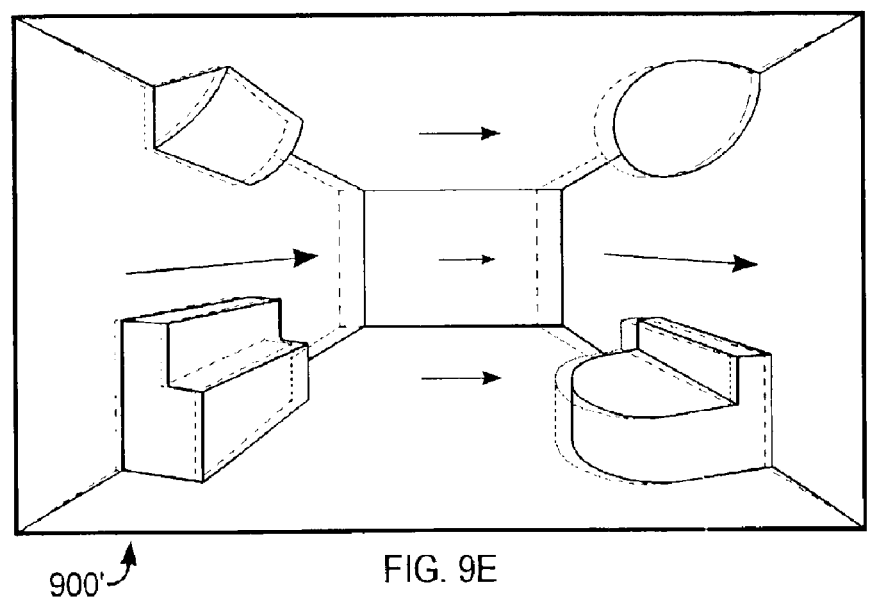
FIG. 9E illustrates the result of all of the objects of FIG. 9A conforming to the correct depth perspective as the entire room is given perspective.

According to various embodiments of the present invention, portions of defining path lines can be used for referencing objects to other objects or to the background. By way of example, FIG. 9D illustrates how the top left corner object 901 can be automatically provided with its correct depth parameters by referencing the portions of the defining path lines (of that object) that are connected to the background. In this case, the user can easily define the portion of the object connected to the background wall and ceiling by referencing the portion 906 of the object that makes contact with the adjacent wall and ceiling. The user can accomplish this, for example, by applying a start point 907 and an end point 908 to identify the portion of path line to be referenced. An identification mark 909, or other visible indicator, can be used to designate the portion of the object that is to be referenced. In this example, a portion 910 of the object path line is not connected to the background wall and should therefore not be referenced. The curved section of the object 901 can be defined as a sub-object and easily bulged outward, for example, by applying a contour line through its center as described in U.S. patent application Ser. No. 10/029,625 entitled "Method And System For Creating Realistic Smooth Three-Dimensional Depth Contours From Two-Dimensional Images." The lower left object 903 can be easily referenced in the same manner by referencing the portion 911 of the path line of the object to its adjacent background, in this case, the floor and left wall. The upper right object 902 represents a curved object for which only the portion 912 of the path line that is both in view and in contact with adjacent background is referenced to the background. The spherical depth shape of this portion of object can be easily added as appropriate by applying (employing) a bulge reference point 913 as shown. The lower right object 904 has its edges also referenced by a path line portion 914 as points along that portion of path line that make contact with the floor and right wall. So referenced, the objects 901, 902, 903 and 904 will now conform, or rather track, the movements of the surroundings to which they are referenced. Referring to FIG. 9E, as depth is applied to the room, the objects—having been referenced to the background object, the room—track the movement of the room.

According to an embodiment of the present invention, a method for converting two-dimensional images into three-dimensional images includes: applying one or more path lines to an image; and associating the path line(s) with a plurality of defined objects in the image such that, when pixels of one of the defined objects are repositioned within the image, the plurality of defined objects remain connected together at the path line(s), wherein at least one of the path lines is a portion of a boundary of one of the defined objects.

According to an embodiment of the present invention, a method for converting two-dimensional images into three-dimensional images includes: identifying a portion of a path line in an image; and using the identified portion to reference a plurality of defined objects within the image together such that, when pixels of one of the defined objects are repositioned within the image, the plurality of defined objects remain connected together at the identified portion of the path line.

According to an embodiment of the present invention, a method for converting two-dimensional images into three-dimensional images includes: linking together a plurality of regions in an image, the plurality of regions including a designated perspective reference region; and automatically applying pixel placement algorithms to the regions in response to a repositioning of pixels in the designated perspective reference region such that the regions remain linked together.

According to an embodiment of the present invention, a method for converting two-dimensional images into three-dimensional images includes: linking together a plurality of objects in an image; and applying a perspective adjustment to the image which repositions pixels within the image causing shapes of the objects to conform to the applied perspective adjustment. By way of example, virtual reference points and/or path lines are used to link together the objects.

Figure 10A:
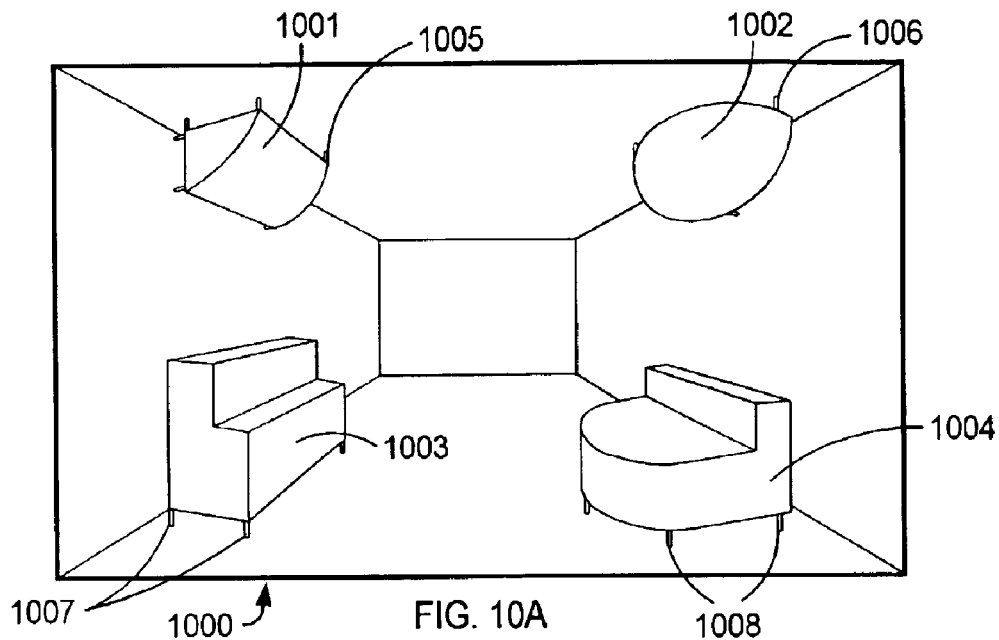
FIG. 10A illustrates an example of the room objects of FIG. 9A, except that the objects are spaced away from their surrounding surfaces.
Figure 10B:
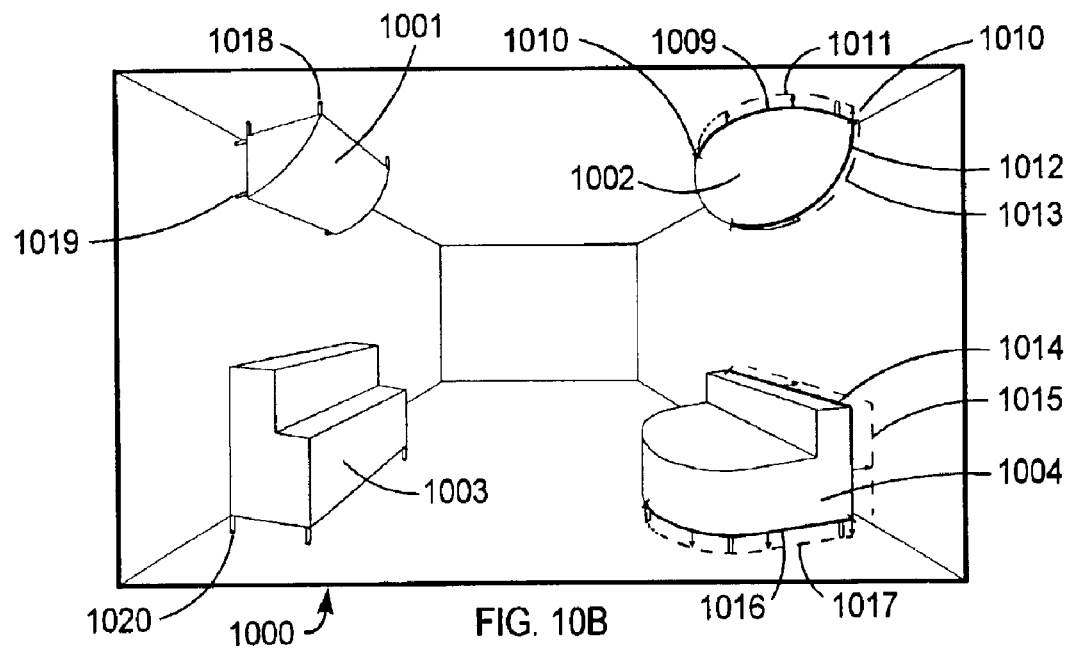
FIG. 10B illustrates the example of FIG. 10A wherein the objects have sections of their path lines defined for use as references projected to the nearest surrounding surfaces.

Various embodiments of the present invention also provide the user with the ability to reference an object to other objects or background in the image that are not adjacent to or necessarily in contact with the object. For example, and referring to FIG. 10A, objects can be referenced to other objects (e.g., background objects such as a wall, floor, ground, etc.) employing "common reference path lines." In FIG. 10A, the image 1000 is similar to the images in FIGS. 9A–9E, except that the objects 1001, 1002, 1003 and 1004 are free standing and not adjacent to their surroundings. For instance, the object 1001 is spaced away from the ceiling and wall by posts 1005, yet it is still desirable to reference the object 1001 to its nearby surroundings, the ceiling and wall. The curved object 1002 is also spaced below the ceiling and away from the wall by posts 1006. Similarly, the objects 1003 and 1004 are positioned off the floor and away from their respective walls by posts 1007 and 1008, respectively. In this example, and referring to FIG. 10B, common reference points or paths are tagged and used to project the object boundaries to their nearest surroundings so the objects will track perspective changes that occur to the room. In FIG. 10B, the top right object 1002 is shown with a top path line 1009 with a section bounded by marking end points 1010 that is to be selected out and projected (referenced) to the ceiling 1011. Similarly, a bottom path line section 1012 is selected out and projected to the wall 1013. By projecting an edge, path or points of an object over to another object ("remote object") or background (e.g., a near adjacent boundary), the projected edge, path or points track movement of the remote object or background. The original projection information, such as positional relationships between the projected edge, path or points and the remote object or background, is updated as the remote object or background is moved and can, in turn, be used to automatically apply depth to the object such that the shape of the object tracks movement of the remote object or background.

Referring still to FIG. 10B, the bottom right object 1004 is another example of an object shape for which two sections of the object are projected to near surroundings. The back section 1014 of the object 1004 is defined to be used as a reference and projected out to the wall 1015. The bottom section 1016 of the object 1004 is similarly defined to be used as a reference and projected out to the floor 1017.

The top left object 1001 and the bottom left object 1003, with their straight edges, are examples of objects for which reference points can be used for projecting to a remote object or background. By way of example, reference points 1018, 1019 and 1020 are applied to the standoff posts (of the objects) that make contact with the ceiling, left wall and floor, respectively, rather than referencing the objects with path lines, as in the previous example. Whether objects are referenced directly with connecting points or path lines, or connected indirectly with projected points or path lines, in either case the present invention provides tools to facilitate the automatic tracking of the depth perspective of an object with the movement of its surroundings.

Similar to the above examples, objects can also be referenced to virtual projected surfaces. A projected virtual surface may be particularly useful in a situation, such as illustrated in FIGS. 11A and 11B, where an object is free standing in space rather than being directly adjacent to other objects. By projecting out a virtual surface, an object can be referenced to another object without having to be adjacent or connected to it. FIGS. 11A and 11B depict such an example whereby an object moves, from an image 1100 to an image 1100', across several frames, changing its size and position by tracking the projected virtual surface to which it has been referenced.

According to an embodiment of the present invention, a method for converting two-dimensional images into three-dimensional images includes: identifying one or more points and/or path lines of a defined object within an image; projecting and referencing the one or more points and/or path lines to another location within the image such that, when pixels associated with the location are repositioned within the image, pixels associated with the defined object are repositioned in a corresponding manner as if the defined object were linked to the location. As discussed above, the other location can be a virtual surface within the image.

According to an embodiment of the present invention, a method for converting two-dimensional images into three-dimensional images includes: employing an interactive user interface to select one or more path lines associated with defined objects in an image and to store information associated with the selected path line(s). For example, at least two of the path lines are interconnected and the information includes path line interconnection information. In another example, the information indicates that at least one of the path lines is associated with more than one of the defined objects. In another embodiment, the method further includes: employing the interactive user interface to recall the stored information to define one or more objects in another image. By way of example, the stored information includes object interconnection information and/or common path line objects information.

Up to this point, the description has pertained to how objects can be individually provided depth and depth references for speed of converting two-dimensional images into three-dimensional images. In various other embodiments of the present invention, the functionality of a plurality of algorithms (e.g., the skew and stretch algorithms) are combined into one cohesive function that provides a continuous mapping of the real plane onto the real plane. This provides a much more efficient method for correlating objects to their appropriate depth location since the process is reduced to a single step rather than multiple steps which saves time. With this method, adjacent objects, if attached to a scene perspective point, track together such that adjacent object path lines remain adjacent. This is a consequence of the continuous nature of the combined process and provides a general continuity of perspective to an image rather than having to rely on additional user input(s) such as referenced object path lines, as previously described. Although this method does not assume anything about the perspective point of the scene, e.g., single point perspective or centered perspective, in most cases, the perspective point will be a single point perspective, ensuring that all objects in the scene align correctly, relative to the scene and to each other, to the perspective of the scene. However, if multiple perspective points are required, this method can be extended to provide a fitting modeling of such conditions.

Referring back to FIG. 9D, a single perspective point can be applied manually or automatically to the image (e.g., to the center of the image) that will provide perspective to the image. The objects 901, 902, 903 and 904 can be provided depth shape either before or after overall perspective is applied to the image. An advantage of this method is that objects conform to their appropriate depth reference location by virtue of the combined perspective process, as with the result illustrated in FIG. 9E. The dashed lines in this figure illustrate the original position of the objects, whereas the solid lines depict the changed position of the objects caused by depth and depth perspective being applied to the image. This significantly speeds up the conversion process which is important when having to convert large numbers of image frames, as in a typical motion picture.

It is rather common for many motion picture sequences to have a camera shot that starts at one angle and, either in a continuous running sequence or scene to scene, changes its angle or position during shooting. According to various embodiments of the present invention, when a camera changes its angle of view depth, algorithms are applied (changed) accordingly to correct for the difference in angular perspective of the changed camera position. Whether depth algorithms are applied to individual or groups of objects, or according to the overall perspective point method described above, the present invention permits further automation for determining changes in camera angles and positions.

Figures 12A, 12B:
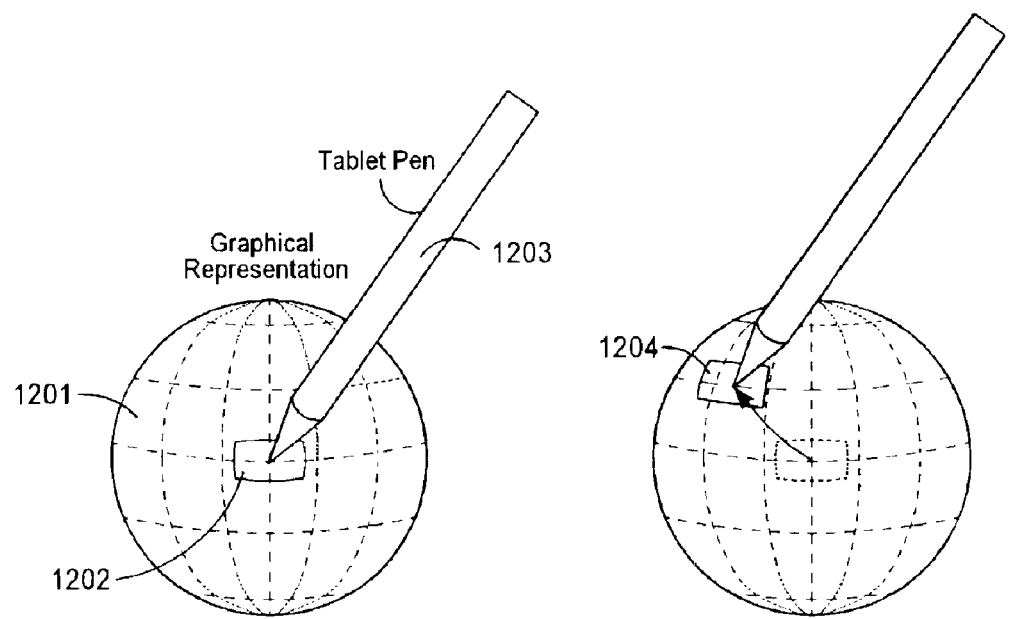
FIG. 12A illustrates a graphical user interface tool for adjusting an original camera angle of a scene.
FIG. 12B illustrates the graphical interface tool of FIG. 12A with the frame being repositioned.
Figures 12C, 12D:
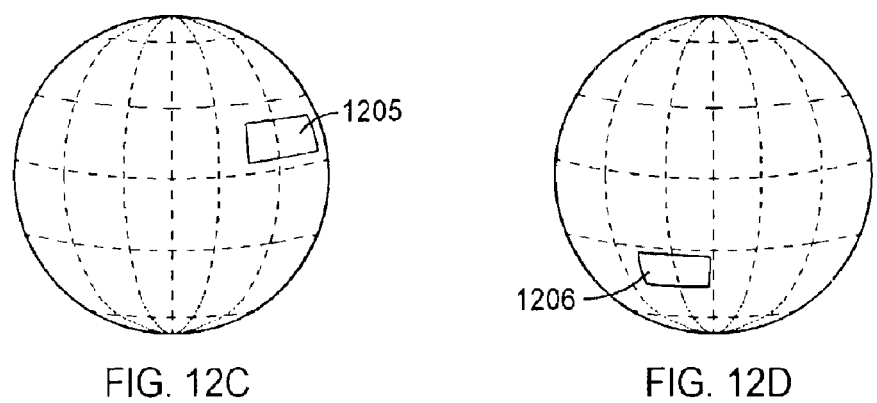
FIG. 12C illustrates the graphical interface tool of FIG. 12A with the frame having been repositioned again.
FIG. 12D illustrates the graphical interface tool of FIG. 12A with the frame having been repositioned yet again.

Various embodiments of the present invention employ methods by way of a graphical user interface that allow the user to input any camera angle position into the system for automatically recalculating appropriate changes to previously set depth algorithms. This saves time since the user does not need to completely readjust algorithms for the changed angle of view. Rather, the user can simply track the position of the camera with the software automatically calculating changes for the new angle of view. FIG. 12A depicts an example of such a graphical user interface in the form of a graphical representation of a sphere 1201. In the illustrated example, the user positions the frame at a center position 1202, assuming that this corresponds to the initial point or angle of view of the camera. A user input device such as a tablet pen 1203 can be used for repositioning the frame to different positions over the sphere 1201. As a default setting, the frame can be centered in shown in FIG. 12A. Referring to FIG. 12B, when the scene is played further down in time to a point where the camera pans or tilts into a different position, in this case the upper left of the image, the user can then use the graphical interface and user input device to grab the frame and drag (or otherwise move) it to the new position 1204. In FIG. 12A, the camera angle points nearly straight to the image. FIG. 12B represents the angle if a camera was shooting downward toward the right of the scene. FIG. 12C illustrates the angular position 1205 as if the camera was shooting downward toward the left of the scene. FIG. 12D illustrates the angular position 1206 of the camera shooting upwards a little toward the right of a scene.

The present invention further pertains to a method for the user to indicate to the system not only the angle, as described above, but also the focal point distance. This allows for full flexibility for perspective correlation of the photographing camera.

Figure 13A:
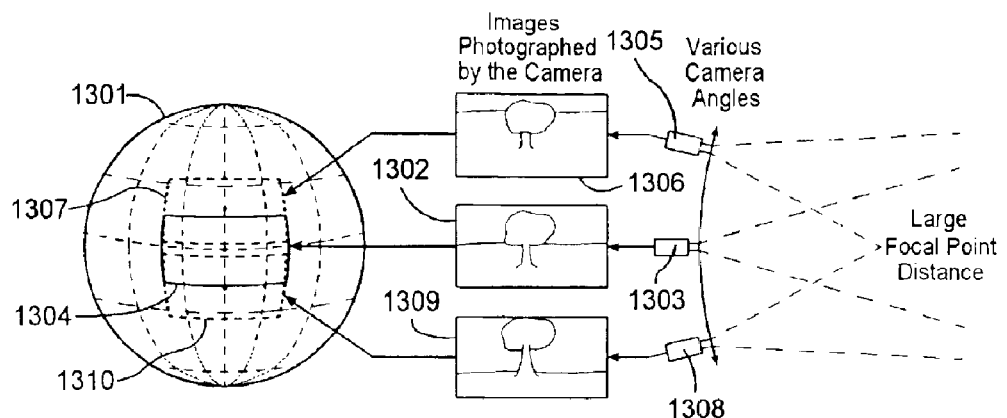
FIG. 13A illustrates a graphical user interface tool for adjusting the focal distance of a virtual camera, the interface showing a correlation between an image and a camera angle over a large focal distance.

Various embodiments of the present invention employ methods by way of a graphical user interface that allow the user to input any focal point distance into the system for automatically recalculating appropriate changes to previously set depth algorithms. FIG. 13A depicts an example of such a graphical user interface in the form of a graphical representation of a sphere 1301. More specifically, FIG. 13A illustrates a graphical user interface tool for adjusting the focal distance of a virtual camera, the interface showing a correlation between an image and a camera angle over a large focal distance. The graphical sphere 1301 helps the user to visualize the correlation between the actual photographed images and how the camera angles translate at different focal point distances. To this end, FIGS. 13B and 13C illustrate use of the graphical interface tool in situations where the camera angle is over a small focal distance and when the focal point is at near infinity, respectively.

Further with regard to FIG. 13A, the graphical interface depicts an image 1302 for which the subject matter (a tree and background horizon) were photographed straight on, or reasonably level from some distance away from the camera position 1303. In this large focal point distance case, the user can adjust the frame size and position 1304 within the graphical sphere to represent what the camera photographed. If the camera happened to shift its position upward to the camera position 1305, looking down at the tree, as shown in the image 1306, then the user would translate this information to the system by repositioning the frame upwards to frame position 1307, to recreate the originally photographed position. Conversely, if the photographed image 1309 revealed that the camera 1308 was pointed upward at the image, then the user would indicate the position of the camera by moving the frame downward to frame position 1310.

Figure 13B:
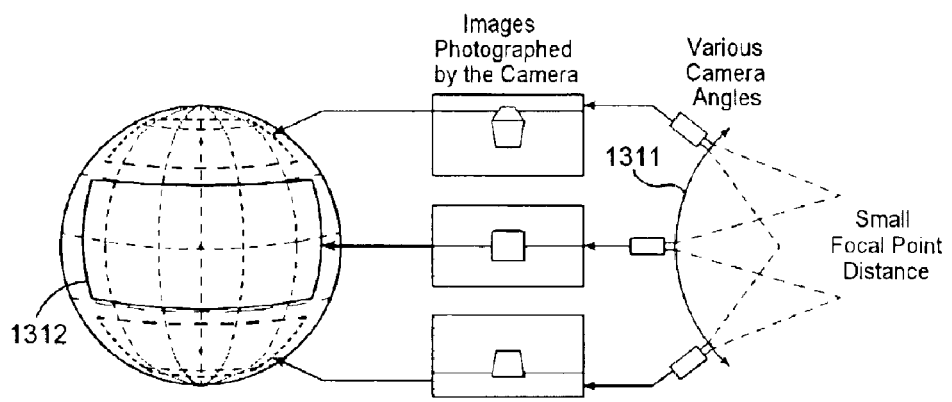
FIG. 13B illustrates the graphical user interface tool of FIG. 13A with the interface showing a correlation between an image and a camera angle over a small focal distance.
Figure 13C:
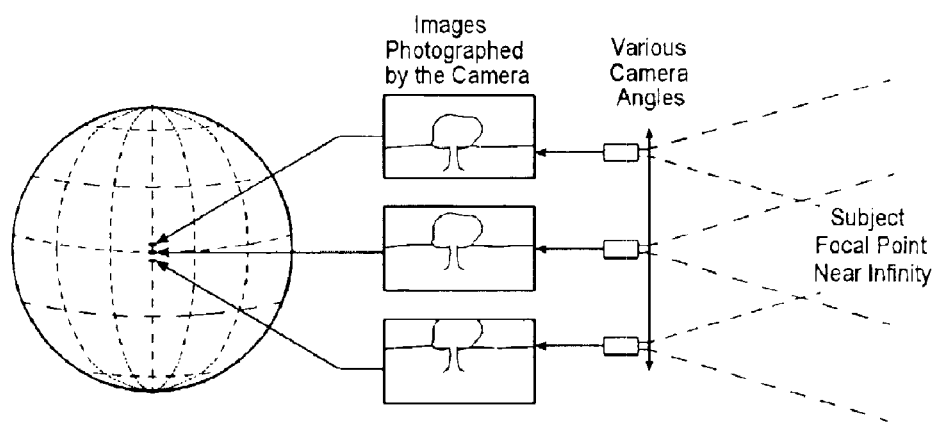
FIG. 13C illustrates the graphical user interface tool of FIG. 13A with the interface showing a correlation between an image and a camera angle when the focal point is at near infinity.

FIG. 13B illustrates what happens when the subject matter (a box) appears to be much closer to the camera. In this case, the angle (or curve 1311) is much greater, should the camera move upwards or downwards pivoting on the subject. The closer distance between camera and subject is represented by the larger frame 1312, within the graphic of the sphere. Referring to FIG. 13C, in the reverse direction, if the camera angle appears to be such that the subject focal point is at near infinity, then the frame within the sphere is reduced towards a point that still can be used for repositioning on the sphere.

According to an embodiment of the present invention, a method for converting two-dimensional images into three-dimensional images includes: employing a graphical interface to adjust an angular perspective and/or a focal distance of a virtual camera associated with an image and to make adjustments to algorithms that cause changes in perceived depths of objects or regions within the image conforming to angular perspective and/or focal distance changes.

Products generated by any of the systems or methods disclosed herein also fall within the scope of the present invention. Such products include, but are not limited to, any three-dimensional image generated employing any of the methods or systems described herein as well as any form of device upon which is stored information (or data) pertaining to any such three-dimensional image (e.g., machine-readable storage media such as digital video disks, digital tape, etc.). Any data storage media that stores images, information or data created employing any of the methods or systems described herein also falls within the scope of the present invention. Accordingly, various embodiments of the present invention are also represented by articles of data storage media upon which are stored images, information or data created employing any of the methods described herein.

According to an embodiment of the present invention, a method for providing a three-dimensional image includes: receiving or accessing data created employing any of the methods described herein; and employing the data to reproduce a three-dimensional image.

Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

We claim:

1. A method for converting two-dimensional images into three-dimensional images, comprising:
   applying one or more path lines to an image; and
   using the path line(s) to reference a plurality of defined objects in the image together such that, when pixels of one of the defined objects are repositioned within the image, the plurality of defined objects remain connected together at the path line(s).

2. The method for converting two-dimensional images into three-dimensional images of claim 1, wherein at least two of the path lines are contiguous.

3. The method for converting two-dimensional images into three-dimensional images of claim 1, wherein at least one of the path lines is a portion of a boundary of one of the defined objects.

4. A method for converting two-dimensional images into three-dimensional images, comprising:
   employing an interactive user interface to reference a partially or completely hidden defined object in an image to a reference defined object in the image such that, when pixels of the reference defined object are repositioned within the image, the partially or completely hidden defined object and the reference defined object remain connected together.

5. The method for converting two-dimensional images into three-dimensional images of claim 4, wherein the partially or completely hidden defined object and the reference defined object are connected together at one or more object points.

6. The method for converting two-dimensional images into three-dimensional images of claim 4, wherein the partially or completely hidden defined object and the reference defined object are connected together at one or more partial or complete path lines.

7. A method for converting two-dimensional images into three-dimensional images, comprising:
   linking together a plurality of regions in an image, the plurality of regions including a designated perspective reference region; and
   automatically applying pixel placement algorithms to the regions in response to a repositioning of pixels in the designated perspective reference region such that the regions remain linked together.

8. A method for converting two-dimensional images into three-dimensional images, comprising:
   identifying a portion of a path line in an image; and
   using the identified portion to reference a plurality of defined objects within the image together such that, when pixels of one of the defined objects are repositioned within the image, the plurality of defined objects remain connected together at the identified portion of the path line.

9. A method for converting two-dimensional images into three-dimensional images, comprising:
   identifying one or more points and/or path lines of a defined object within an image;
   projecting and referencing the one or more points and/or path lines to another location within the image such that, when pixels associated with the location are repositioned within the image, pixels associated with the defined object are repositioned in a corresponding manner as if the defined object were linked to the location.

10. The method for converting two-dimensional images into three-dimensional images of claim 9, wherein the other location comprises a virtual surface within the image.

11. A method for converting two-dimensional images into three-dimensional images, comprising:
    linking together a plurality of objects in an image; and
    applying a perspective adjustment to the image which repositions pixels within the image causing shapes of the objects to conform to the applied perspective adjustment.

12. The method for converting two-dimensional images into three-dimensional images of claim 11, wherein virtual reference points and/or path lines are used to link together the objects.

13. An article of data storage media upon which is stored images, information or data created employing any of the methods of claims 1–6, 7, 8 and 9–12.

14. A method for providing a three-dimensional image, comprising:
    receiving or accessing data created employing any of the methods of claims 1–6, 7, 8 and 9–12; and
    employing the data to reproduce a three-dimensional image.

* * * * *